United States Patent [19]

Garbar et al.

[11] Patent Number: 4,565,703
[45] Date of Patent: Jan. 21, 1986

[54] METHOD FOR PREPARING BREAD DOUGH

[76] Inventors: Henry J. Garbar; Joan H. Garbar, both of 95 Winding Rd., Madison, Conn. 06443

[21] Appl. No.: 579,408
[22] Filed: Feb. 13, 1984

Related U.S. Application Data

[63] Continuation-in-part of Ser. No. 343,493, Jan. 28, 1982, abandoned.

[51] Int. Cl.[4] .......................... G01N 7/22; A21D 6/00; F27D 11/00
[52] U.S. Cl. ...................................... 426/232; 73/169; 126/281; 219/385; 426/233; 426/505
[58] Field of Search ............... 426/496, 505, 232, 233, 426/128, 19, 523; 73/169; 126/281; 219/385, 386, 218

[56] References Cited

U.S. PATENT DOCUMENTS

| | | | |
|---|---|---|---|
| 366,968 | 7/1887 | McClave | 126/281 |
| 1,429,269 | 9/1922 | Banks | 73/169 |
| 1,654,897 | 1/1928 | Rosenblum | 73/169 |
| 2,507,425 | 5/1950 | Swartout | 126/281 |
| 2,577,220 | 12/1951 | Winfree | 426/232 |

FOREIGN PATENT DOCUMENTS 428174  5/1935  United Kingdom .................. 73/169

Primary Examiner—George Yeung
Attorney, Agent, or Firm—William W. Jones

[57] ABSTRACT

Disclosed is a method and apparatus for optimizing the rising of bread dough, in home bread baking. The apparatus includes a bread board which is preferably foldable and which is electrically heated to a temperature between 78° and 85° whereby dough kneaded thereon is simultaneously heated. After initial kneading, the dough is flattened on the board and allowed to rise in the flattened condition while a hood for the board retains heat and moisture. The bread board is preferably provided with a removable cloth cover to keep the board clean and to aid kneading, and the board may have a projecting member which engages a table top edge, to prevent lateral motion during kneading. The periphery of the flattened dough mass is confined during rising and provision is made to alert the baker when the flattened dough mass has risen to twice its initial volume.

3 Claims, 6 Drawing Figures

METHOD FOR PREPARING BREAD DOUGH

This is a continuation-in-part of our copending application Ser. No. 343,493, filed Jan. 28, 1982, now abandoned.

The present invention relates to the preparation of ingredients for baking, most particularly to techniques used during leavening of wheat containing bread dough.

Many people engage in the baking of breads and similar foodstuffs in their homes. The most common home making of bread requires that flour be mixed with ingredients such as yeast, water and others which suit the taste. The ingredients are mixed together to form a pasty mass of dough. Typically a yeast, such as baker's yeast, is added at about 2 weight percent to the dough. Yeast is included so that it will generate carbon dioxide gas by fermenting sugars such as glucose, fructose, maltose, and sucrose which are present in the dough. Other yeast activity products also flavor the baked product and alter the dough's physical properties. For the living yeast cells to perform their desired function, they must be heated somewhat above room temperature.

The carbon dioxide gas evolved must be retained within the dough mass and this is facilitated by presence in the dough of gluten which is the protein part of the wheat berry. As a result of mechanical activity caused by kneading of the dough, gluten forms an elastic substance which enables the dough to retain, as a fine array of bubbles, the gas generated by the yeast.

Thus, consistency in the steps of kneading of the dough, and causing the yeast to become active by moderate heating, are important in the manufacture of quality home baked products. However, the home bread making process is typically inconsistent. The normal routine which is followed is to spiritedly push and fold the dough mass for a period of time. This activity is commonly carried out on a smooth counter top or bread board, at room temperature of about 68° F.(20° C.). The next step commonly used, as taught by most baking recipe books, is to put the kneaded dough in a common bowl, as a large ball covered by a damp cloth. This is put in a warm place, such as a warm oven, or on a room heater, etc. Over a period of time the heat from the environment will penetrate the dough, increasing the activity of the yeast, thereby causing the dough to rise by action of the expanding gases. Of course, the environment cannot be too warm, elsewise the yeast may be killed.

Traditionally, a dough rising period may be from one-half to five hours, depending on the temperature of the environment. One of the principal reasons such a long time may be required is that it takes time for the heat to penetrate through the mass of dough due to its shape. On the other hand, care must be taken to not "over rise" the dough—that is, allow the dough to rise for too long a time—because an unpleasant yeasty taste may result. Ultimately, the dough may even deflate and fall back on itself. Conversely, if the dough does not rise sufficiently, then the texture will be heavy and glue-like. The preferred rise of the dough is reached by the dough having approximately doubled in size. Again, due to the shape of the dough mass when the latter is put into a bowl or the like to rise, it is difficult for the occasional baker to accurately judge when the doubling in size has occurred.

After rising, the bread dough is typically "punched down", meaning that it is deflated and kneaded again. The object of this step is to give the bread an even texture and to get rid of the larger gas bubbles. Then, the dough is allowed to rise again, in essentially a repeat of the first step. As the yeast is continuing to ferment, additional punchings and risings may be utilized. Finally, the dough is put in an oven and heated to a high temperature in the baking step.

As should be evident, the carrying out of the kneading and rising operation requires attention to detail and is time consuming. In addition variations in the temperature of the room and the temperature during the rising step can affect the result. Naturally, commercial bakers use specialized equipment, including chambers having a controlled temperature and humidity environment. See for instance, Stock U.S. Pat. No. 3,518,949 and McKay U.S. Pat. No. 3,456,598. Obviously equipment that is in commercial use is not suited for home baking of bread because of cost and complexity.

In Sparks U.S. Pat. No. 3,418,453, discloses an electrically heated dough raising oven suited for home use. The oven is essentially a cardboard box having a light bulb as a heating source. The dough, contained in pans, is placed in the chamber and heated by convection of the air within. Weiss in U.S. Pat. No. 4,210,073 discloses a portable environmental chamber which is useful in rising or proofing of dough. Basically, dough which is contained in a bowl standing on a flat surface is enveloped in a tent-like device. The tent-like covering has included in its surface heating elements which, by a combination of radiation and convection, heat the dough in the bowl. These prior art devices are helpful in providing better control of the dough temperature but, the time and uniformity of rising will still be limited by the fact that the dough is heated as a roughly spherical mass, from the exterior. Also, different shapes of dough masses will have different rising times, contributing to variability in the end product.

As will be apparent from the foregoing, the occasional home-bread baker will encounter problems relating to the ability to detect when the dough has risen to its preferred volume, i.e., has doubled in size, and relating to the time needed to enable the dough to rise in the preferred manner. The prior art has recognized that a dough mass should be monitored while rising to ensure that it has doubled in volume during each rising step. For example, A. J. Banks U.S. Pat. No. 1,429,269, issued Sept. 19, 1922 discloses a fermentation meter which serves to monitor and measure the degree of expansion of a rising mass of dough. C. D. Swartout U.S. Pat. No. 2,507,425, issued May 9, 1950 discloses a compound container and lid which contains a rising mass of dough and provides an indication of the degree to which the dough mass has risen. A. A. Rosenblum U.S. Pat. No. 1,654,897, issued Jan. 3, 1928 discloses an apparatus for testing and detecting the amount of rise which a fermenting mass of dough undergoes. The aforesaid concepts disclosed in these patents are subject to certain problems of accuracy and time due principally to the shape of the dough mass as it is set aside to rise. We address these problems in the following manner.

This invention is intended to improve the process by which bread is leavened, particularly the steps during which the bread dough is caused to rise. Specifically, this invention is operable to speed and ease the task of making bread at home, and to minimize the amount of skill and attention required to make a uniform baked product in the home.

In accordance with the invention, dough is heated at the same time as it is being kneaded, by heating the bread board on which the kneading is carried out to a temperature in the range of 78°–85° F., preferably to a temperature of about 85° F. (30° C.). The heated bread board used in the practice of the invention is preferably fitted with means for preventing the board from sliding about during the kneading step. Preferably the board has a projecting member which engages the edge of the table on which the board is placed for use.

Preferably, the board may be made of a conductive metal such as aluminum. The board is preferably provided with a medial hinged joint to allow it to be folded into a compact configuration for storage. A cloth cover is provided which can be attached to the edges of the board and removed therefrom for cleaning. The cloth provides a textured surface on which the bread dough is worked. To prevent loss of moisture and heat, a concave hood which fits about the board is preferably used. When resting on the board, this hood provides an enclosed space above the board within which the dough may rise.

Lateral barriers are adapted to be fitted onto the board preferably in fixed position so as to confine the entire periphery of the rising dough mass whereby substantially all of the expansion of the dough mass will occur in a direction perpendicular to the plane of the board. The barriers should be at least partially adjustable to accommodate different initial amounts of dough. An indicator is preferably used in conjunction with the device to enable one to determine when the dough has expanded to twice its initial volume.

In the preferred use of the apparatus, the dough is worked upon the heated cloth-covered board, whereby the dough is kneaded and heated simultaneously, until it achieves a desired consistency. Because the dough contacts the heated board as a relatively large surface area mass during this step, the initial kneading is made easy. In fact, rising starts to occur after about five minutes. When the dough has been kneaded to develop the desired consistency, it is spread as a flat mass on the board within the barriers which are put in place on the board so as to confine the entire periphery of the flattened dough mass. It will be noted that the periphery of the thus confined dough mass will be restricted to planes which are perpendicular to the surface of the board. The indicator may take the form of visible markings on the lateral barriers, with one marking indicating the initial level of the flattened dough mass, i.e., the starting point, and another marking indicating when the dough mass will have doubled in volume. Alternatively, the indicator may take the form of a moveable member which contacts the top of the flattened dough mass to ride thereon during the entire rising period. This type of indicator will move upward as the dough rises and will have provisions for identifying the desired initial thickness of the flattened dough mass, and also the desired final thickness of the flattened dough mass which will be reached when the dough mass has doubled in volume.

After the flattened dough mass has been placed on the board and been confined laterally, the hood will be placed on the board to promote desirable rising conditions. The hood can be relatively transparent to enable monitoring of the indicator or, in the case of a moveable indicator, the latter can project through an opening in the hood for ready observation.

Since the dough mass is placed on the heated board in a flattened form, rather than as a rounded ball or amorphous lump, the heat from the board spreads through the dough faster and more evenly to speed up rising of the dough considerably. Confinement of the lateral edges of the flattened dough mass insures that all expansion of the dough will be in a direction perpendicular to the surface of the board which results in very accurate measurements of the dough mass as it rises. The ability to adjust the position of at least some of the confining members on the board enables one to use the same starting point and the same finishing point on the indicator regardless of the initial volume of dough being used. This greatly enhances the utility of the apparatus and method of this invention.

It is, therefore, an object of this invention to provide a method and apparatus for use in preparing dough for baking wherein the duration of the preparation time is greatly reduced.

It is a further object of this invention to provide a method and apparatus of the character described wherein the dough is kneaded on a heated board and placed thereon in a flattened mass to rise.

It is an additional object of this invention to provide a method and apparatus of the character described wherein provision is made for confining all lateral edges of the flattened dough mass during rising so that all expansion of the dough occurs in a direction perpendicular to the surface of the board on which the dough rests.

It is another object of this invention to provide a method and apparatus of the character described wherein the expansion of the flattened dough mass is monitored to provide an indication of when the risen volume of the dough is twice the initial volume.

These and other objects, features and advantages of the present invention will become more apparent from the following description of preferred embodiments thereof when taken in conjunction with the accompanying drawings, in which.

The invention is described in terms of the preparation of dough for bread, however, it will be understood that the invention will be equally useful with other kinds of bakery products, including those made using the sourdough method.

Figure 1:
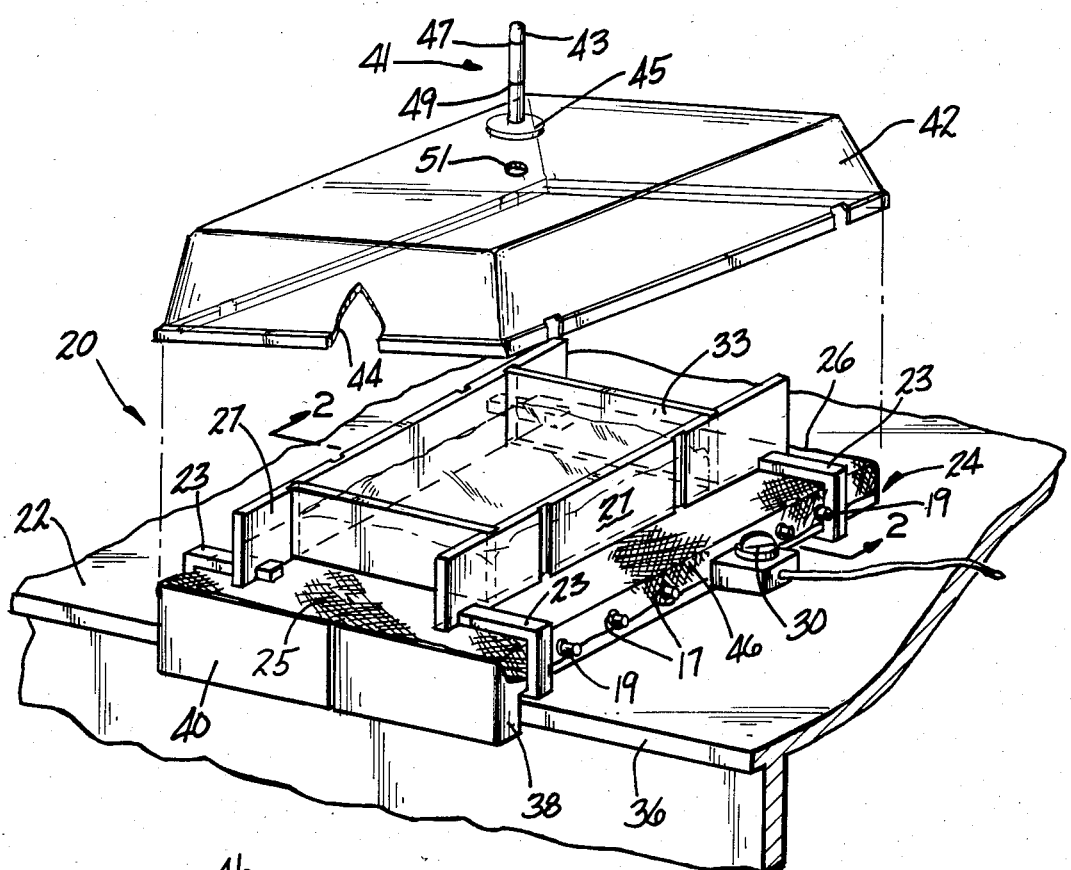
FIG. 1 is a partially exploded perspective view of a preferred embodiment of an apparatus formed in accordance with this invention.
Figure 2:
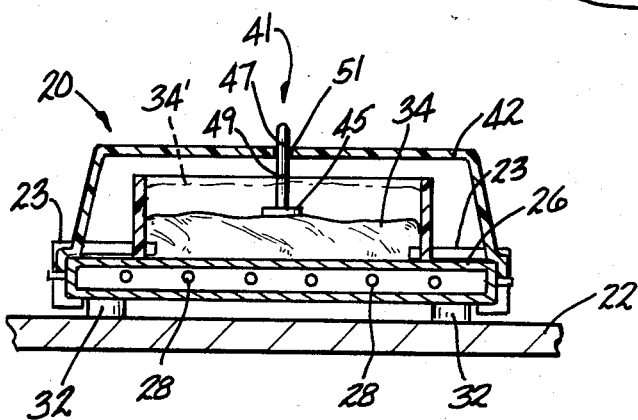
FIG. 2 is a sectional view of the apparatus taken along line 2—2 of FIG. 1.

FIGS. 1 and 2 generally show a preferred embodiment of the apparatus 20 of the invention, mounted on a table surface 22. The board 24, which has a substantially planar top surface 26, is preferably made of aluminum or other heat transmitting material. Incorporated into the board 24 are electric resistance heating elements, 28. Electric power to the elements 28 is regulated by means of controller 30 which enables precise setting of the temperature of the board. Preferably, the board is at a temperature of about 85° F. (30° C.)

The board is supported on the table surface by the short feet 32 which may be of a plastic, metal, or elastomer. Preferably, they are of an elastomer which provides frictional resistance to motion, with respect to the table surface 22. Shown resting on the top of surface 26 of the board is a dough mass 34. The working surface 26 of the board 24 is covered with a cloth cover 25 which is stretched over the board. The cloth 25 is provided with grommets 17 which engage pins 19 projecting from the sides of the board 24. The dough mass is ordinarily worked by pushing and pulling motion, perpendicular to the edge 36 of the table surface 22, as is described below in more detail. Thus, there is a tendency for the board to move in the same direction. Accordingly, the board 24 is fitted with a projection 38 which extends below the plane of the surface 22 of the table. Of course, this plane is the same as the plane of the projecting ends of the feet 32 of the board. Thus, the projection member 38 engages the edge 36 of the table and prevents motion of the board across the table. When a person uses the bread board, the person may press his or her body against the front edge 40 of the member 38 whereby outward motion of the board away from the edge of the table 22 will be prevented as well, and the board will remain stationary during use, regardless of pushing or pulling of dough across the board surface.

Also shown in FIGS. 1 and 2 is a hood 42, preferably made of transparent material, such as acrylic plastic, which hood 42 will serve to retain the heat which tends to rise from the board, and to retain the moisture in the dough mass. The hood 42 is adapted to fit around the periphery of the board, with its stepped side wall 44 engaging the edges 40, 46 of the periphery of the board.

Figure 4:
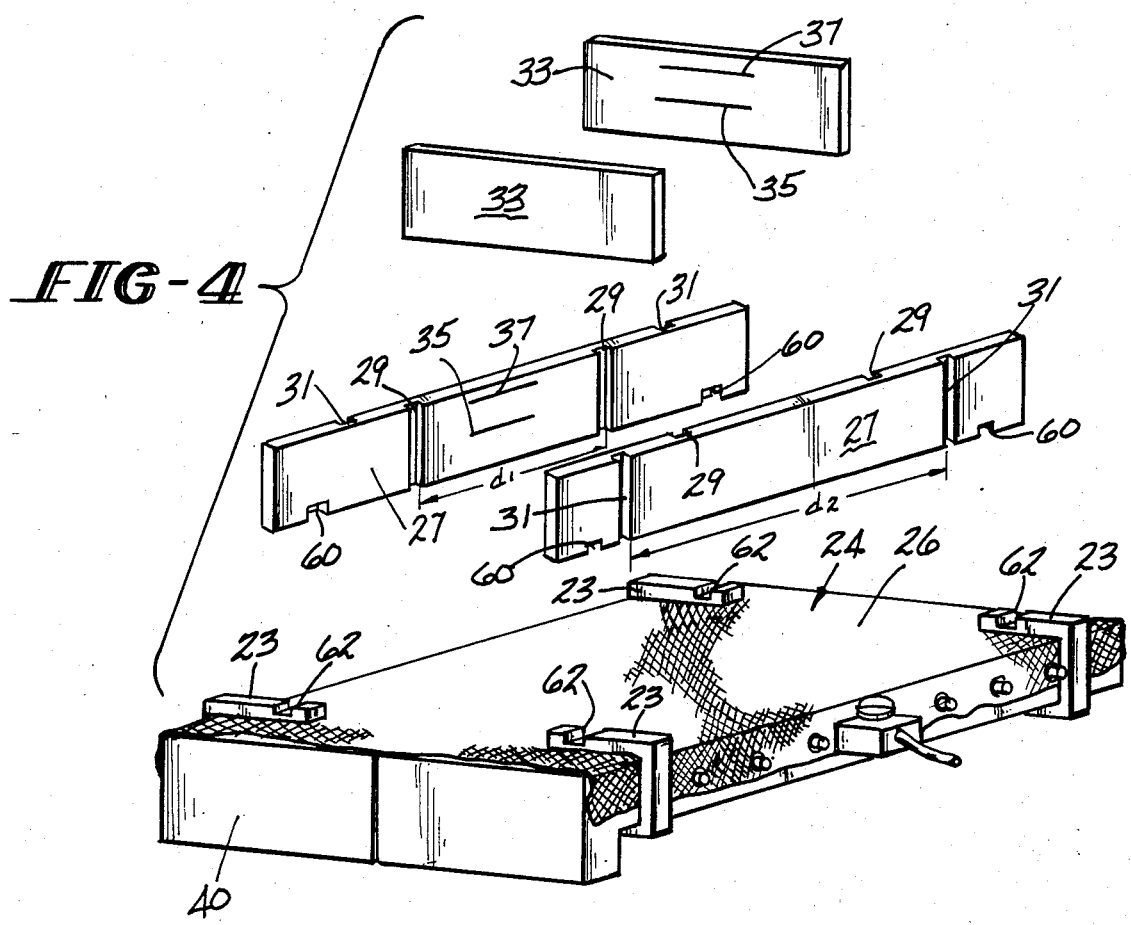
FIG. 4 is an exploded perspective view of the board and the perimeter confining plates of FIG. 1.

The board 24 is formed with C-shaped clips 23 which snap onto the board and overlie the cloth cover 25. The clips 23 are adapted to receive a pair of elongated plates 27 which, when mounted in the clips 23 are fixed perpendicular to the surface 26 of the board 24, as shown in FIG. 1. Referring to FIG. 4, each plate 27 is provided with a first pair of parallel slots 29 formed on one side thereof, and with a second pair of parallel slots 31 formed on the opposite side thereof. The distance $d^1$ between the slots 29 is preferably twice the distance $d^2$ between the slots 31. A second pair of elongated plates 33 are provided and are adapted to be slidably inserted into the slots 29 or 31 in the plates 27 so as to extend there between, as shown in FIG. 1. The plates 27 and 33 may be provided with visible indicia lines 35 and 37 which, when the plates 27 and 33 are fixed in place on the board 24, are a predetermined distance above the surface 26 of the board 24. The indicia lines 35 and 37 are used to indicate when a flattened dough mass has risen to twice its initial volume on the board 24, with the line 35 providing an indication to the user of the proper initial height of a flattened dough mass confined by the plates 27 and 33, and the line 37 providing an indication to the user of when the dough mass has risen to twice its initial volume. Different paired indicia lines can be used of the same plate for different types of dough, or different plates can be used for different types of dough. The plates 27 are provided with notches 60 which interfit with mating notches 62 formed on the upper surface of the clips 23. The notches 60 and 62 insure that the plates 27 are adequately secured in place on the board 24 so as to be capable of confining the edges of the dough mass.

As an alternative to the indicia lines 35 and 37 as means for gauging the amount of rise of the flattened dough mass, an elongated gauge 41 shown in FIGS. 1 and 2 can be used in conjunction with the hood 42. The gauge 41 includes an elongated stem 43 and an annular foot 45 secured to the base of the stem 43. A pair of indicia marks 47 and 49 are disposed on the stem 43 spaced along the axis thereof. The foot 45 rests on the top of the flattened, confined dough mass 34 and the stem 43 projects through an opening 51 in the top of the hood 42. The proper degree of flattening of the dough mass is ascertained by insuring that the indicia mark 47 is aligned with the outer top surface of the hood 42 when the latter is placed properly on the board 24. When the dough has risen sufficiently to lift the stem 43 so as to align the indicia mark 49 with the outer top surface of the hood 42, the dough 34 will have risen so as to double its initial volume so that the user will be alerted to remove the dough from the apparatus for further processing. As noted above, provisions can be made to adapt this type of gauge for use with different types of dough.

Figure 3:
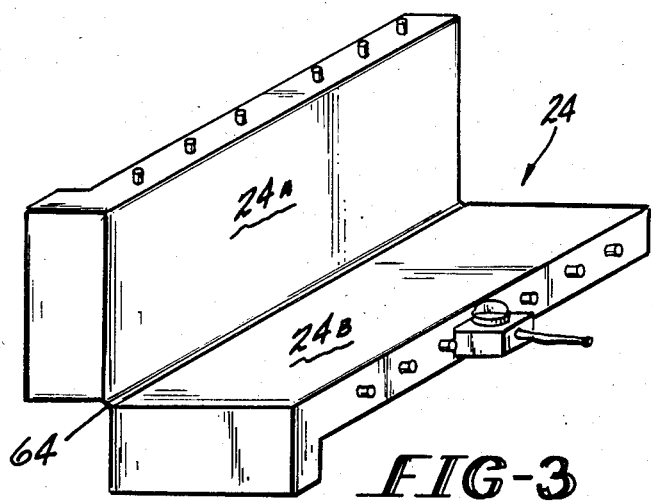
FIG. 3 is a perspective view of the board showing the manner in which it is folded for storage.

Referring to FIG. 3, it will be noted that the board 24 is provided with a medial hinge 64 so as to divide the board 24 into opposed halves 24A and 24B which can be pivoted from a compact face-to-face position for storage, to the flattened positions shown in FIG. 1. The cloth cover 25 can be fitted onto the board 24 when the latter is in an intermediate pivotal position and then stretched tightly over the top surface of the board when the latter is pivoted to its flat working position.

Figure 5:
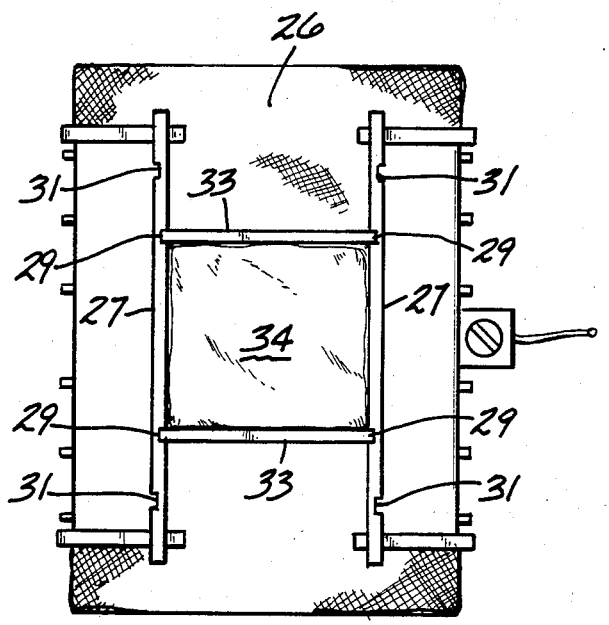
FIG. 5 is a top plan view of the apparatus of FIG. 1 showing the perimeter confining plates in a single recipe position.
Figure 6:
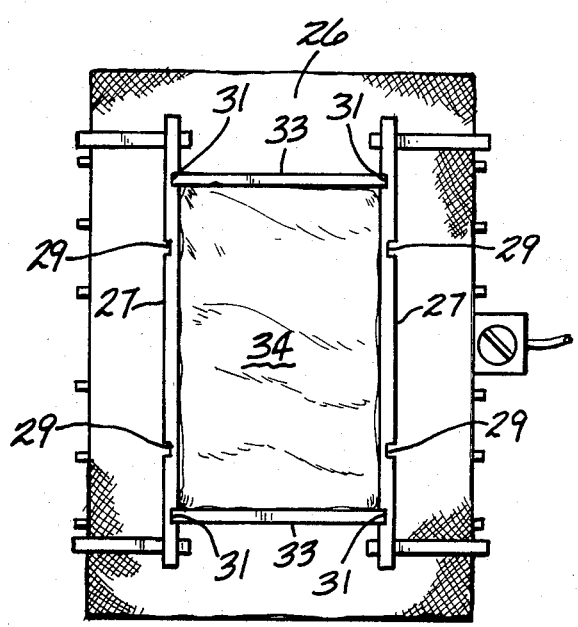
FIG. 6 is a top plan view similar to FIG. 5 but showing the perimenter confining plates in a double recipe position.

Referring now to FIGS. 5 and 6, there is shown the manner in which the plates 27 and 33 are set up to provide for different volumes of the flattened dough mass. When the user desires to use a single recipe for a volume of dough which forms a known number of bread loaves, which would be a base recipe, the plates 27 are set in the clips 23 with the slots 29 on the opposed plates 27 facing each other. The plates 33 are then set into the opposed slots 29 and the kneaded dough mass is placed within the confines of the plates 27 and 33 and flattened on the heated board 26 until the top surface of the flattened dough mass 34 is even with the lower indicia marks 35 on the plates 27 and 33. As previously noted, the marks 35 and 37 will be pregauged to be operable with given bread dough recipes. The hood 42 is then placed over the flattened confined dough mass 34 on the board, as shown in FIG. 2 to entrap heat and moisture and the dough is allowed to rise. When the top surface of the rising dough mass reaches the indicia marks 37, rising has progressed to the point where the volume of dough has doubled from its original volume, and the dough is removed from the apparatus.

When a double recipe is used, the plates 27 are reversed and set in slots 25 with the slots 31 in the opposed plates 27 facing each other, as shown in FIG. 6. The plates 33 are then set in place in the slots 31 and the dough mass is placed within the confines of the plates 27 and 33 and flattened down thereon as described above. The rising process then proceeds as described above until doubling of the dough mass is noted. The rising of the dough is indicated in FIG. 2 by the phantom line 34.

In use, the board is allowed to heat up to its operating temperature. Next, the dough which has been mixed in a separate bowl, is placed on the cloth 25 covering the surface 26 of the board. While pressing against the edge 40 of the board, so the projection member 38 is pushed firmly against the edge 36 of the table top, the user proceeds to knead the dough. During this step the dough is simultaneously heated by its continuously changing contact with the surface of the board. We prefer to use a motion which comprises pushing and pulling only on the dough, in contrast to the normal routine of pushing, then rotating the spread-out dough mass 90 degrees, folding it over on itself, and pushing again, to repeat the process. After the dough has been kneaded to a consistency which experience shows is desirable, confining plates 27 and 33 are put in place, the dough is spread to as flat a mass, as possible, so as to align the top surface of the flattened dough mass with the markings 35, or to align the marking 47 on the gauge 41 with the top of the hood 42. With the hood in place on the dough board, the dough is left stationary as it rises. Typically, with this invention this will take about ten minutes. The hood 42 retains moisture and warmth, preserving dough properties and speeding rising. Then following the traditional procedure, the dough is "punched down" on the board and again confined in a flat mass, covered, and the dough is allowed to rise a second time. Additional risings may be used. Usually, after the second rising the dough is removed from the covered board, put in a pan or the like, placed on the board and allowed to rise in the pan before being placed in an oven for baking.

Thus, it will be seen that the combination of the steps of kneading on the heated surface, and spreading the dough out flatly on a heated surface while it is confined and covered, serve to greatly speed the imparting of heat to the dough mass and allow accurate initial and final volume measurement. Also, the controlled temperature of the surface of the board prevents overheating. The kneading step is easier because the heating makes the dough softer and more pliable; the start of rising also contributes to this effect. Since the rising starts during kneading and is relatively rapid thereafter, the home baker is not frustrated or discouraged by having to wait a prolonged and uncertain period for the rising to take place.

The board is preferably made of a metal or other good heat conducting material, to provide most uniform temperatures; however, ceramics and glass will be found generally usable, as will certain heat tolerant polymers. Preferably, the heating component will be electric resistance wires embedded in the material of the board. Alternately, elements may be attached to the underside of a board formed of thin sheet metal or the like. If the board's surface is made of glass or other non-conductive material, conductive surface films may be adhered to the underside of the surface of the board.

The hood may be made of various materials and in various configurations while carrying out the objects of the invention. It is desirable that the hood be transparent, to observe the indicia markings which monitor rising of the dough. In the event that the hood should become fogged by moisture from the rising dough, the hood can be momentarily lifted to check the degree of rise on the barriers. The hood may alternately be made of an insulating material, to lower energy requirements. To ease storage problems of the apparatus, the hood may be configured to permit collapsing or folding to a thin shape and the elements of the hood may be hinged or designed for easy disassembly.

It will be appreciated that by flattening and confining the perimeter of the dough mass on the heated board surface and then allowing the flattened, heated dough mass to rise, the heat from the board will spread through the dough mass quicker and more evenly than were the dough allowed to rise as an amorphous mass. Thus the period of time needed for rising any given quantity of dough will be significantly lowered. The flattened, confined dough mass also enables significantly greater volume measurement to be made so as to enable one to more accurately determine when the initial amount of dough has doubled in volume. The adjustability of the confining plates allows great latitude of use for this invention. It will be understood that, while the confining means is disclosed as sets of parallel plates fixed to the heated board, such fixation of the plates to the board can be dispensed with, and the confining means can also take other forms, such as circular, or the like.

Although this invention has been shown and described with respect to a preferred embodiment, it will be understood by those skilled in this art that various changes in form and detail thereof may be made without departing from the spirit and scope of the claimed invention.

What is claimed is:

1. In a method for rising bread dough in an apparatus having an electrically heated support member with a generally planar top surface and having first and second height indicator means disposed above said planar top surface, the improvement comprising:
   (a) flattening a mass of kneaded dough on said support member top surface to impart to said dough mass a generally planar upper surface, said upper surface being substantially parallel to said support member top surface and said upper surface being a first predetermined distance above said support member top surface as measured by said first height indicator means;
   (b) confining substantially the entire periphery of the flattened dough mass while the latter is on said support member top surface to restrict the periphery of the dough mass to planes substantially perpendicular to said support member top surface;
   (c) covering said flattened confined dough mass to provide a heat and moisture retaining environment in which said dough mass will rise solely in a direction perpendicular to said support member top surface until the dough mass upper surface reaches a second predetermined distance above said support member top surface as measured by said second height indicator means; and
   (d) removing the risen dough mass from the support member.

2. The method of claim 1 further comprising the preliminary step of kneading the dough mass on said top surface of said heated support member.

3. The method of claim 1 wherein said dough mass has doubled its initial volume when its upper surface reaches said second predetermined distance above said support member top surface.

* * * * *